(12) United States Patent
Burckart et al.

(10) Patent No.: US 8,825,833 B2
(45) Date of Patent: Sep. 2, 2014

(54) TRACKING COMPUTER SYSTEM CONFIGURATION CHANGES WITH CORRESPONDING MESSAGE RESPONSES

(75) Inventors: Erik J. Burckart, Raleigh, NC (US); Jeffrey E. Care, Morrisville, NC (US); David J. Schell, Raleigh, NC (US); Ryan L. Urquhart, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1826 days.

(21) Appl. No.: 11/094,028

(22) Filed: Mar. 30, 2005

(65) Prior Publication Data
US 2006/0253553 A1 Nov. 9, 2006

(51) Int. Cl.
*G06F 15/173* (2006.01)
(52) U.S. Cl.
USPC .......................................................... 709/224
(58) Field of Classification Search
USPC ................................................. 709/223, 224
See application file for complete search history.

(56) References Cited

U.S. PATENT DOCUMENTS

| | | | |
|---|---|---|---|
| 5,115,505 A | 5/1992 | Bishop et al. | |
| 5,764,920 A | 6/1998 | Cook et al. | |
| 5,857,074 A | 1/1999 | Johnson | |
| 6,212,559 B1 * | 4/2001 | Bixler et al. | 709/221 |
| 6,233,634 B1 | 5/2001 | Clark et al. | |
| 6,289,378 B1 * | 9/2001 | Meyer et al. | 709/223 |
| 6,308,148 B1 | 10/2001 | Bruins et al. | |
| 6,308,282 B1 | 10/2001 | Huang et al. | |
| 6,665,716 B1 | 12/2003 | Hirata et al. | |
| 6,735,772 B1 | 5/2004 | MacPhail | |
| 6,748,416 B2 | 6/2004 | Carpenter et al. | |
| 6,789,114 B1 | 9/2004 | Garg et al. | |
| 2004/0167976 A1 * | 8/2004 | Peer | 709/223 |

FOREIGN PATENT DOCUMENTS

JP 5342225 A 12/1993

OTHER PUBLICATIONS

Huang et al., IBM Technical Disclosure Bulletin, vol. 37, No. 7, Jul. 1994, "Knowledge Base Structure for Fault Management", pp. 521-525.

* cited by examiner

*Primary Examiner* — Scott Christensen
(74) *Attorney, Agent, or Firm* — Lee Law, PLLC; Christopher B. Lee

(57) ABSTRACT

Under the present invention, when a configuration change for a computer system is monitored and a message corresponding thereto is issued, a response to the message will be observed. Thereafter, the configuration change, the message and the response will be logged. In logging this information, the respective times and identities of corresponding users will be stored together. Thus, if an error condition results from the configuration change, a supervisor or the like will be able to access the log file and see (among other things): (1) the configuration change that caused the error condition; (2) the identity of the user who made it; and (3) the user's response to the corresponding message that was provided.

21 Claims, 3 Drawing Sheets

TRACKING COMPUTER SYSTEM CONFIGURATION CHANGES WITH CORRESPONDING MESSAGE RESPONSES

BACKGROUND OF THE INVENTION

1. Field of the Invention

The present invention generally relates to configuration management. Specifically, the present invention provides a method, system and program product for tracking computer system configuration changes with corresponding message responses.

2. Related Art

Most middleware systems today provide administrative functions and user interfaces to allow system administrators to configure and manage development and production level systems. A key role of the administrators is to get the systems configured quickly and ensure that they remain operational and available on a nearly absolute 24/7 basis. System downtime for some businesses can be critical, resulting in millions of dollars of revenue lost per hour or even minutes. This puts enormous pressure on administrators to take appropriate but prudent actions when maintaining these systems. If a system does go down (catastrophic or otherwise), typically there is extensive causal analysis done to determine the failure points, often involving supervisory personnel of the administrators responsible. Administrators are held highly accountable for the actions they take (or do not take) in keeping their systems available.

To aid in problem prevention, most software systems provide mechanisms to administrators to warn of potential problems or error conditions. Such mechanisms typically come in the form of warning messages and informational messages. As autonomic computing advances, these warning systems will become increasingly advanced, all to the benefit of the administrators. However, if administrators fail to heed or act on the warnings or information, catastrophic failures can still occur. In some of these instances, supervisory personnel can check system logs to see what warning and information messages were issued. Unfortunately, no current system provides direct one-to-one tracking of the responses or follow-up actions by the administrators to the messages. This makes is extremely difficult for the supervisory personnel to determine why the failures were caused, who was responsible, and whether the failures were avoidable.

SUMMARY OF THE INVENTION

In general, the present invention provides a method, system and program product for tracking computer system configuration changes with corresponding message responses. Specifically, the present invention allows configuration changes to be tracked on a one-to-one basis with any corresponding messages and associated responses so that the causes and avoidability of error conditions can be readily determined. To this extent, under the present invention, when a configuration change for a computer system is monitored and a message corresponding thereto is issued, a response to the message will be observed. Thereafter, the configuration change, the message and the response will be logged. In logging this information, the respective times and identities of corresponding users will be stored together. Thus, if an error condition results from the configuration change, a supervisor or the like will be able to access the log file and see (among other things): (1) the configuration changes that may have caused the error condition; (2) the identity of the user who made it; and (3) the user's response to the corresponding message that was provided.

A first aspect of the present invention provides a method for tracking computer system configuration changes with corresponding message responses, comprising: monitoring a configuration change for a computer system; observing a response to a message provided pursuant to the configuration change; and storing the configuration change with the message and the response in a log file.

A second aspect of the present invention provides a system for tracking computer system configuration changes with corresponding message responses, comprising: a configuration system for monitoring a configuration change for a computer system; a message response system for observing a response to a message provided pursuant to the configuration change; and a log system for storing the configuration change with the message and the response in a log file.

A third aspect of the present invention provides a program product stored on a computer readable medium for tracking computer system configuration changes with corresponding message responses, the computer readable medium comprising program code for performing the following steps: monitoring a configuration change for a computer system; observing a response to a message provided pursuant to the configuration change; and storing the configuration change with the message and the response in a log file.

A fourth aspect of the present invention provides a method for deploying an application for tracking computer system configuration changes with corresponding message responses, comprising: providing a computer infrastructure being operable to: monitor a configuration change for a computer system; observe a response to a message provided pursuant to the configuration change; and store the configuration change with the message and the response in a log file.

A fifth aspect of the present invention provides computer software embodied in a propagated signal for tracking computer system configuration changes with corresponding message responses, the computer software comprising instructions to cause a computer system to perform the following functions: monitor a configuration change for a computer system; observe a response to a message provided pursuant to the configuration change; and store the configuration change with the message and the response in a log file.

A sixth aspect of the present invention provides a business method for tracking computer system configuration changes with corresponding message responses.

A seventh aspect of the present invention provides a system to correlate error conditions with probable configuration causes.

An eighth aspect of the present invention provides a system to determine if actual configuration changes were within a set of possible configuration issues composed by the system that correlated the error conditions with the probable configuration changes and which may have resulted in those error conditions.

A ninth aspect of the present invention provides a system that tracks users who made configuration issues which were within a set of possible configuration issues composed by the system which correlated the error conditions with the probably configuration changes which may have resulted in those error conditions.

A tenth aspect of the present invention provides a system that is able to retrieve from its logs any warning or informational messages displayed to the user when they made configuration changes which were within a set of possible configuration issues composed by the system which correlated the error conditions with the probable configuration changes which may have resulted in those error conditions.

An eleventh aspect of the present invention provides a system that can display to a supervisor the configuration changes, the user who made the changes, the time the user made the changes, and informational or warning messages that user was shown which are retrieved from the system logs; where the configuration changes were within a set of possible configuration issues composed by the system which correlated the error conditions with the probable configuration changes which may have resulted in those error conditions.

Therefore, the present invention provides a method, system and program product for tracking computer system configuration changes with corresponding message responses.

BRIEF DESCRIPTION OF THE DRAWINGS

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE DRAWINGS

As indicated above, the present invention provides a method, system and program product for tracking computer system configuration changes with corresponding message responses. Specifically, the present invention allows configuration changes to be tracked on a one-to-one basis with any corresponding messages and associated responses so that the causes and avoidability of error conditions can be readily determined. To this extent, under the present invention, when a configuration change for a computer system is monitored and a message corresponding thereto is issued, a response to the message will be observed. Thereafter, the configuration change, the message and the response will be logged. In logging this information, the respective times and identities of corresponding users will be stored together. Thus, if an error condition results from the configuration change, a supervisor or the like will be able to access the log file and see (among other things): (1) the configuration change that caused the error condition; (2) the identity of the user who made it; and (3) the user's response to the corresponding message that was provided.

As used herein, the term "message" is intended to refer to any type of message that can be provided pursuant to a configuration change. Thus, the term message is intended to encompass both warning and informational messages. In addition, the term "configuration change" is intended to mean any type of configuration change that can be made to a computer system and/or computer network.

Figure 1:
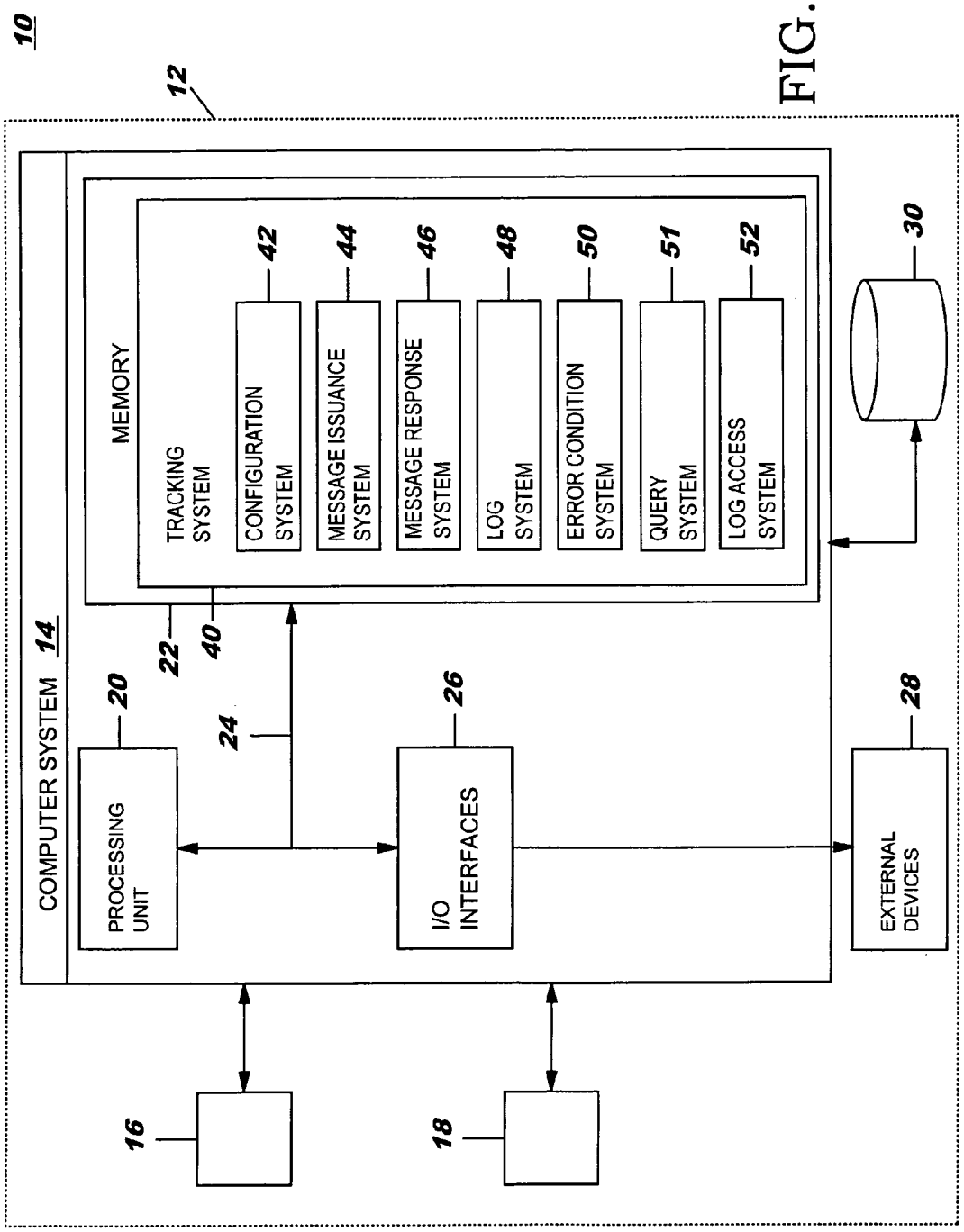
FIG. 1 shows an illustrative system for tracking computer system configuration changes with corresponding message responses according to the present invention.

Referring now to FIG. 1, a system 10 for tracking computer system configuration changes with corresponding message responses according to the present invention is shown. As depicted, system 10 includes a computer infrastructure 12, which comprises a computer system 14. As will be further described below, tracking system 40 will be used to track configuration changes made by administrator 16 on a one-to-one basis with resulting messages and associated responses.

In the illustrative embodiment shown in FIG. 1, tracking system 40 is shown loaded on the same computer system 14 for which administrator 16 will make configuration changes. However, this need not be the case. For example, administrator 16 could make changes to another computer system (not shown) that is monitored by tracking system 40. Such a computer system may or may not be contained within the same computer infrastructure as the computer system on which tracking system 40 is loaded. To this extent, as will be further described below, tracking system 40, computer system 14 and/or computer infrastructure 12 can deployed and/or managed by a third party service provider that is tracking configuration changes and corresponding messages for customers. In such an embodiment, tracking system 40 could track configuration changes and corresponding messages for a plurality of other computers. That is, tracking system 40 is not limited to performing such functions for a single computer system at a time. In any event, tracking system 40 can be part of or work in conjunction with any existing system that monitors configuration changes and provides messages. Moreover, computer system 14 is intended to represent any type of computer system capable of carrying out the teachings of the present invention. Examples include a laptop computer, a desktop computer, a workstation, a handheld device, etc.

It should be understood that in the event two or more computer systems are provided, such computer systems could communicate directly, or over a network (e.g., the Internet, a wide area network (WAN), a local area network (LAN), a virtual private network (VPN), etc. In the case of the latter, communication between the computer systems could occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

In any event, computer system 14 is shown including a processing unit 20, a memory 22, a bus 24, and input/output (I/O) interfaces 26. Further, computer system 14 is shown in communication with external I/O devices/resources 28 and storage system 30. In general, processing unit 20 executes computer program code, such as tracking system 40, which is stored in memory 22 and/or storage system 30. While executing computer program code, processing unit 20 can read and/or write data, to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer infrastructures that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention. Such information can include, for example, log files, etc. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is tracking system 40, which includes configuration system 42, message issuance system 44, message response system 46, log system 48, error condition system 50, query system 51, and log access system 52. Operation of each of these systems is discussed further below. However, it is understood that some of the various systems shown in FIG. 1 can be implemented independently, combined, and/or stored in memory for one or more separate computers systems that communicate over a network. Further, it is understood that some of the systems/functionality may not be implemented and/or additional systems/functionality may be included as part of the present invention. Still yet, it is understood that the depiction of these systems shown in FIG. 1 is illustrative only and that the same functionality could be achieved with a different configuration. That is, the functionality of these systems could be combined into fewer systems, or broken down into additional systems.

Under the present invention, tracking system 40 will track configuration changes made by administrator 16 on a one-to-one basis with any resulting messages that are issued and administrator 16's responses thereto. Assume in an illustrative embodiment that administrator 16 adjusted the memory allocation for computer system 14. Under the present invention the configuration change would be detected/monitored by configuration system 42. The monitoring of the configuration change can occur in any known means. For example, configuration system 42 could be programmed to detect any configuration changes made by administrator 16 or the like. Alternatively, configuration system 42 could be programmed to receive notifications of configuration changes. In any event, when the configuration change is monitored, message issuance system 44 will display any corresponding messages to administrator 16. In one embodiment, message issuance system 44 could be programmed to generate and display each message based on the proposed configuration change. In another embodiment, memory 22 or storage system 30 could contain a "library" of messages that should be displayed in response to certain configuration changes. In any event, assume that when the memory allocation is changed, message issuance system 44 displays a message indicating that a "Memory Shortage May Occur."

Figure 2:
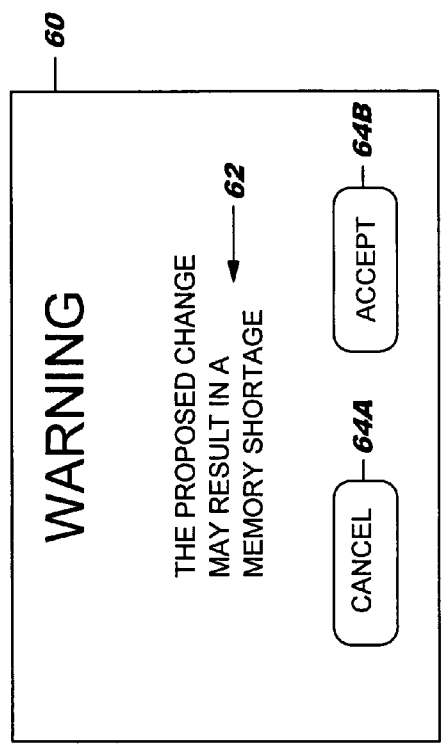
FIG. 2 shows an illustrative message according to the present invention.

Referring to FIG. 2, an illustration of such a message 60 is shown. As depicted, message 60 informs administrator 16 (FIG. 1) of a possible error condition 62 that may be caused should he/she proceed with the configuration change. Administrator 16 can accept the warning by selecting button 64A at which time the configuration change will not be made. However, administrator 16 can also chose to ignore the warning by selecting button 64B at which time the configuration change will be made irrespective of the warning. Any response issued by administrator 16 will be received by message response system 46.

Assume in this example that administrator 16 selected button 64B and ignored the warning. Referring back to FIG. 1, this response to message 60 (FIG. 2) would be observed or received by message response system 46 and the configuration change would be made. Under the present invention, the configuration change, message 60 and the response made by administrator 16 would be stored together in a log file by log system 48. This typically involves storing the time for each, as well as an identity of administrator 16.

Figure 3:
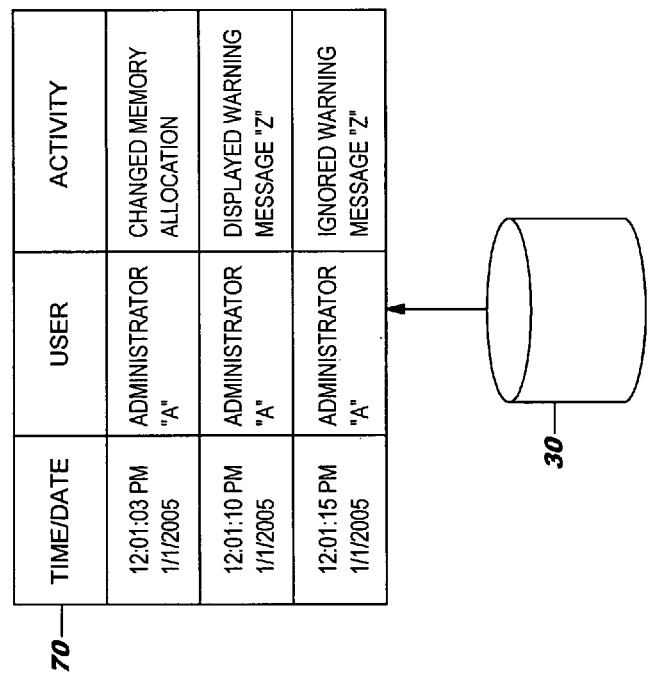
FIG. 3 shows an illustrative logging scheme according to the present invention.

Referring to FIG. 3, an illustrative logging operation as performed by log system 48 is more clearly shown. Specifically, FIG. 3 shows an illustrative log file 70 for computer system 14 based on the above series of activities. As can be seen at time 12:01:03 PM on Jan. 1, 2005, configuration system 42 (FIG. 1) monitored an attempt by Administrator "A" (i.e., administrator 16 of FIG. 1) to change the memory allocation of computer system 14. At time 12:01:10 PM on Jan. 1, 2005, message issuance system 44 (FIG. 1) displayed warning message "Z." Then, at time 12:01:15 PM on Jan. 1, 2005, message response system 46 observed that Administrator "A" ignored warning message "Z." These activities were associated with one another and stored in log file 70 by log system 48 (FIG. 1).

Referring back to FIG. 1, assume now that the configuration change made by administrator 16 actually caused a memory shortage to occur. This error condition would be detected by error condition system 50. Under the present invention, error conditions can be detected automatically by error condition system 50 (e.g., via detection of an error message), or they could be manually identified to error condition system 50 based upon observations, end-user input or the like. When the error condition is observed, log system 48 can optionally associate and store the same in log file 70 (FIG. 3) (i.e., along with the configuration change, display of warning message "Z" and ignoring of warning message "Z").

In any event, assume that upon occurrence of the error condition, supervisor 18 wishes to know who was responsible. Supervisor 18 can select the error conditions from a set (e.g., a list) of possible error conditions. Query system 51 will then automatically generate a query to determine whether any configuration changes (such as the above) lead to the error condition. To this extent, each possible error condition is associated (e.g., in storage unit 30) with one or more configuration changes that may have caused that error condition. Query system 51 will then find the union of possible configuration changes that would have caused this error condition and the actual configuration changes that occurred. Each configuration change that could cause an error condition will also have an associated message. Accordingly, supervisor 18 can be presented with a list of the possible configuration changes that caused the error condition, who made the change, the time of the change, and the messages that were ignored.

Along similar lines, the present invention also allows supervisor 18 to utilize log access system 52 to access log file 70 and view the series of events that unfolded. In so doing, supervisor 18 will easily be able to see who made the configuration change and who ignored the warning message. It could be the case that the individual making the configuration change was different that the one who ignored the warning message, in which case both would be partially to blame. Using the above example, supervisor 18 will access log file 70 and note that Administrator "A" proposed a configuration change, was presented with warning message "Z" and chose to ignore it. As such, supervisor 18 will know exactly who was to blame for the memory shortage. Thus, the present invention creates an error or configuration "object" that provides a mapping of error conditions to activities leading up thereto.

ILLUSTRATIVE EXAMPLES

Shown below are two additional illustrative examples according to the present invention.

Administrator "A" adjusts the timeouts in server 1 to an unordinary large size for specific requests to server 2. The system warns Administrator "A" that this could tie up excess resources in server 1 if anything should happen to server 2 causing performance degradation and possibly unrecoverable errors. Server 2 then has a bug, causing excessively slow performance and response times. The system comes to a halt as server 1 dies because of resource exhaustion (out of threads, memory, etc) and users cannot access the server. After the system has recovered, Administrator "A's" supervisor tries to track down who made these changes as well as some proof as to whether they knew these changes would cause problems. The logs clearly show that not only did Administrator "A" make the timeout changes, he accepted the message that stated that this may cause performance degradation in server 1.

Administrator "B" is adjusting the settings of server 2. While doing so, Administrator "B" created a new listening transport on port 8000. When creating this listener, the system displayed a message stating that committing this action would create a new listener for users to access this system on. Administrator "B" clicked "Ignore" and the server saved the configuration and started up the listener. Weeks later, server 2 was found to have been accessed by an unauthorized user on port 8000. Administrator "B's" supervisor was able to find out through the logs that no only did Administrator "B" create this new listener, he was informed again that the action he took would create a new listener. The boss could then be certain that Administrator "B" did not "accidentally" create this hole in the system unknowingly.

While shown and described herein as a method and system for tracking computer system configuration changes with corresponding message responses, it is understood that the invention further provides various alternative embodiments. For example, in one embodiment, the invention provides a computer-readable medium that includes computer program code to enable a computer infrastructure to analyze demographical factors of a computer system to address error conditions. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to track computer system configuration changes with corresponding message responses as described above. In this case, the service provider can create, maintain, support, etc., a computer infrastructure, such as computer infrastructure 12 (FIG. 1) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for tracking computer system configuration changes with corresponding message responses. In this case, a computer infrastructure, such as computer infrastructure 12 (FIG. 1), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for tracking computer system configuration changes with corresponding message responses, comprising:
   at a change tracking computer system:
      monitoring a plurality of computer systems for configuration changes;
      detecting initiation of a configuration change for a computer system of the monitored plurality of computer systems;

issuing a message selected from a database comprising a library of configuration change messages for the plurality of computer systems based upon the configuration change in response to detecting the initiation of the configuration change, wherein the selected message warns of a potential error condition due to the configuration change being issued from the computer system and requires a response, wherein the response requires choosing to accept the message or ignore the message, wherein accepting the message cancels the configuration change and ignoring the message allows the configuration change;

observing the response to the selected message;

storing the configuration change with the selected message and the response in a log file within the database;

detecting that an error condition with the computer system has occurred;

querying the database in response to detecting the error condition to determine configuration changes identified within the database as possible causes of the detected error condition; and determining whether the configuration change is one of the determined configuration changes identified within the database as possible causes of the detected error condition.

2. The method of claim 1, further comprising:
storing the potential error condition with the configuration change, the selected message and the response in the log file within the database.

3. The method of claim 1, wherein the storing step comprises storing a time of the configuration change, a time of the message and a time of the response along with an identity of a user making the configuration change and an identity of a user issuing the response to the message in the log file.

4. The method of claim 1, further comprising accessing the log file after the error condition in the computer system is detected to determine an identity of a user making the configuration change and issuing the response to the warning message.

5. The method of claim 4, further comprising displaying the configuration changes identified within the database as possible causes of the detected error condition, wherein the configuration changes are displayed with identities of users who made the configuration changes and responses to any messages that were provided pursuant to the configuration changes.

6. The method of claim 2, where the potential error condition, the configuration change, the selected message, and the response stored in the log file within the database comprise a series of events leading up to the error condition and where storing the potential error condition with the configuration change, the selected message and the response in the log file within the database comprises creating an error object within the database that maps the error condition to the series of events leading up to the error condition.

7. A system, comprising at least one computer device, for tracking computer system configuration changes with corresponding message responses, comprising:
a database comprising a library of configuration change messages for a plurality of computer systems; and
a processor programmed to:
monitor the plurality of computer systems for configuration changes;
detect initiation of a configuration change for a computer system of the monitored plurality of computer systems;
issue a message selected from the database based upon the configuration change in response to detecting the initiation of the configuration change, wherein the selected message warns of a potential error condition due to the configuration change being issued from the computer system and requires a response, wherein the response requires choosing to accept the message or ignore the message, wherein accepting the message cancels the configuration change and ignoring the message allows the configuration change;
observe the response to the selected message;
store the configuration change with the selected message and the response in a log file within the database;
detect that an error condition with the computer system has occurred;
query the database in response to detecting the error condition to determine configuration changes identified within the database as possible causes of the detected error condition; and
determine whether the configuration change is one of the determined configuration changes identified within the database as possible causes of the detected error condition.

8. The system of claim 7, where the processor is further programmed to store the potential error condition with the configuration change, the selected message and the response in the log file within the database.

9. The system of claim 7, where the processor is further programmed to store a time of the configuration change, a time of the message and a time of the response along with an identity of a user making the configuration change and an identity of a user issuing the response to the message in the log file.

10. The system of claim 7, where the processor is further programmed to:
present a set of possible configuration changes that may have caused the error condition; and
access the log file after the error condition in the computer system is detected to determine an identity of a user making the configuration change and issuing the response to the message.

11. The system of claim 10, where the processor is further programmed to display the configuration changes identified within the database as possible causes of the detected error condition, wherein the configuration changes are displayed with identities of users who made the configuration changes and responses to any messages that were provided pursuant to the configuration changes.

12. The system of claim 8, where the potential error condition, the configuration change, the selected message, and the response stored in the log file within the database comprise a series of events leading up to the error condition and where, in being programmed to store the potential error condition with the configuration change, the selected message and the response in the log file within the database, the processor is programmed to create an error object within the database that maps the error condition to the series of events leading up to the error condition.

13. A program product stored on a non-transitory computer-readable storage medium for tracking computer system configuration changes with corresponding message responses, the non-transitory computer-readable storage medium comprising program code that, when executed by a computer, causes the computer to:
monitor a plurality of computer systems for configuration changes;

detect initiation of a configuration change for a computer system of the monitored plurality of computer systems;

issue a message selected from a database comprising a library of configuration change messages for the plurality of computer systems based upon the configuration change in response to detecting the initiation of the configuration change, wherein the selected message warns of a potential error condition due to the configuration change being stored within a database comprising a library of configuration change messages and issued from the computer system and requires a response, wherein the response requires choosing to accept the message or ignore the message, wherein accepting the message cancels the configuration change and ignoring the message allows the configuration change;

observe the response to the selected message;

store the configuration change with the selected message and the response in a log file within the database;

detect that an error condition with the computer system has occurred;

query the database in response to detecting the error condition to determine configuration changes identified within the database as possible causes of the detected error condition; and determine whether the configuration change is one of the determined configuration changes identified within the database as possible causes of the detected error condition.

14. The program product of claim 13, wherein the non-transitory computer-readable storage medium further comprises program code that, when executed by the computer, causes the computer to:

store the potential error condition with the configuration change, the selected message and the response in the log file within the database.

15. The program product of claim 13, wherein the program code that, when executed by the computer, causes the computer to store the configuration change with the selected message and the response in a log file within the database comprises program code that, when executed by the computer, causes the computer to store a time of the configuration change, a time of the message and a time of the response along with an identity of a user making the configuration change and an identity of a user issuing the response to the message in the log file.

16. The program product of claim 13, wherein the non-transitory computer-readable storage medium further comprises program code that, when executed by the computer, causes the computer to:

present a set of possible configuration changes identified within the database as possible causes of the detected error condition; and access the log file after the error condition in the computer system is detected to determine an identity of a user making the configuration change and issuing the response to the warning message.

17. The program product of claim 16, wherein the non-transitory computer-readable storage medium further comprises program code that, when executed by the computer, causes the computer to: display the configuration changes identified within the database as possible causes of the detected error condition, wherein the configuration changes are displayed with identities of users who made the configuration changes and responses to any messages that were provided pursuant to the configuration changes.

18. The program product of claim 14, where the potential error condition, the configuration change, the selected message, and the response stored in the log file within the database comprise a series of events leading up to the error condition and where, in causing the computer to store the potential error condition with the configuration change, the selected message and the response in the log file within the database, the program code, when executed by the computer, causes the computer to create an error object within the database that maps the error condition to the series of events leading up to the error condition.

19. A method for deploying an application for tracking computer system configuration changes with corresponding message responses, comprising:

providing a computer infrastructure being operable to:

monitor a plurality of computer systems for configuration changes;

detect initiation of a configuration change for a computer system of the monitored plurality of computer systems;

issue a message selected from a database comprising a library of configuration change messages for the plurality of computer systems based upon the configuration change in response to detecting the initiation of the configuration change, wherein the selected message warns of a potential error condition due to the configuration change being issued from the computer system and requires a response, wherein the response requires choosing to accept the message or ignore the message, wherein accepting the message cancels the configuration change and ignoring the message allows the configuration change;

observe the response to the selected message;

store the configuration change with the selected message and the response in a log file within the database;

detect that an error condition with the computer system has occurred;

query the database in response to detecting the error condition to determine configuration changes identified within the database as possible causes of the detected error condition; and determine whether the configuration change is one of the determined configuration changes identified within the database as possible causes of the detected error condition.

20. The method of claim 19, wherein the computer infrastructure is further operable to:

store the potential error condition with the configuration change, the selected message and the response in the log file within the database.

21. The method of claim 20, where the potential error condition, the configuration change, the selected message, and the response stored in the log file within the database comprise a series of events leading up to the error condition and where storing the potential error condition with the configuration change, the selected message and the response in the log file within the database comprises creating an error object within the database that maps the error condition to the series of events leading up to the error condition.

* * * * *